(12) United States Patent
Giuntini

(10) Patent No.: US 12,218,595 B2
(45) Date of Patent: Feb. 4, 2025

(54) DOUBLE-BOOST DC/DC CONVERTER

(71) Applicant: ABB Schweiz AG, Baden (CH)

(72) Inventor: Lorenzo Giuntini, Locarno (CH)

(73) Assignee: ABB Schweiz AG, Baden (CH)

( * ) Notice: Subject to any disclaimer, the term of this patent is extended or adjusted under 35 U.S.C. 154(b) by 174 days.

(21) Appl. No.: 17/737,158

(22) Filed: May 5, 2022

(65) Prior Publication Data

US 2022/0360176 A1 Nov. 10, 2022

(30) Foreign Application Priority Data

May 6, 2021 (EP) ..................................... 21172502

(51) Int. Cl.
*H02M 3/158* (2006.01)
*H02M 1/088* (2006.01)

(52) U.S. Cl.
CPC ......... *H02M 3/1582* (2013.01); *H02M 1/088* (2013.01)

(58) Field of Classification Search
CPC .... H02M 3/156; H02M 3/158; H02M 3/1582; H02M 1/088; H02M 1/00
See application file for complete search history.

(56) References Cited

U.S. PATENT DOCUMENTS

| | | | |
|---|---|---|---|
| 6,353,547 B1 * | 3/2002 | Jang | H02M 3/33571 363/16 |
| 7,352,083 B2 | 4/2008 | Nielsen et al. | |
| 7,688,048 B2 | 3/2010 | Nielsen | |
| 7,898,110 B2 | 3/2011 | Song | |
| 8,008,809 B2 | 8/2011 | Nielsen | |
| 8,400,792 B2 | 3/2013 | Sato et al. | |
| 8,482,154 B2 | 7/2013 | Sato et al. | |
| 8,513,928 B2 | 8/2013 | Tötterman et al. | |
| 8,547,073 B2 | 10/2013 | Fujii | |
| 8,994,216 B2 | 3/2015 | Sato et al. | |
| 9,935,549 B2 | 4/2018 | Westmoreland | |
| 10,050,469 B2 | 8/2018 | Nishimura et al. | |
| 10,211,672 B2 | 2/2019 | Mouridsen | |
| 10,263,457 B2 | 4/2019 | Nishimura et al. | |
| 10,298,128 B2 | 5/2019 | Westmoreland | |
| 10,454,301 B2 | 10/2019 | Lo Torto et al. | |
| 11,349,336 B2 * | 5/2022 | Lai | H02M 1/4233 |

(Continued)

OTHER PUBLICATIONS

Jeong et al., "High-efficiency three-phase bidirectional dc-ac converter for energy storage systems," *IET Power Electronics*, 12(8): 2031-2037 (Jul. 10, 2019).

(Continued)

*Primary Examiner* — Adolf D Berhane
(74) *Attorney, Agent, or Firm* — Leydig, Voit & Mayer, Ltd.

(57) ABSTRACT

A voltage balancing circuit for a double-boost DC/DC converter includes a split DC-link having a first midpoint, outer directional devices and inner switches parallel-connected to the DC-link, wherein the outer directional devices are connected to capacitors of the split DC-link and to the inner switches. The inner switches are connected to each other at a second midpoint. A DC source terminal, to which a DC source is connectable in parallel over inductances to the inner switches, is included. An inductance is connected to the midpoint of the DC link and to the midpoint of the inner switches.

9 Claims, 6 Drawing Sheets

(56) References Cited

U.S. PATENT DOCUMENTS

2021/0203222 A1\* 7/2021 Ilic ........................ H02M 1/083
2021/0351703 A1\* 11/2021 Sigamani ................ H02M 3/01

OTHER PUBLICATIONS

Lee et al., "An Analysis of Midpoint Balance for the Neutral-Point-Clamped Three-Level VSI," *PESC 98 Record. 29th Annual IEEE Power Electronics Specialists Conference* (Cat. No. 98CH36196), IEEE, 1: 193-199 (May 17, 1998).
Serban et al., "Voltage and Power Balancing in Solar and Energy Storage Converters," *2019 IEEE Energy Conversion Congress and Exposition* (*ECCE*), IEEE, 5832-5839 (Sep. 29, 2019).
Shi et al., "Capacitor Voltage Balancing of a Three-Level Bi-Directional Buck-Boost Converter for Battery Energy Storage System," *2014 17th International Conference on Electrical Machines and Systems* (*ICEMS*), IEEE, 325-329 (Oct. 22-25, 2014).
European Patent Office, Extended European Search Report in European Patent Application No. 21172502.3, 7 pp. (Oct. 5, 2021).
Patrao et al., "Grid-tie inverter topology with maximum power extraction from two photovoltaic arrays," *IET Renewable Power Generation*, 8(6): 638-648 (Aug. 1, 2014).
European Patent Office, Office Action in European Patent Application No. 21172502.3, 6 pp. (Jul. 28, 2023).

\* cited by examiner

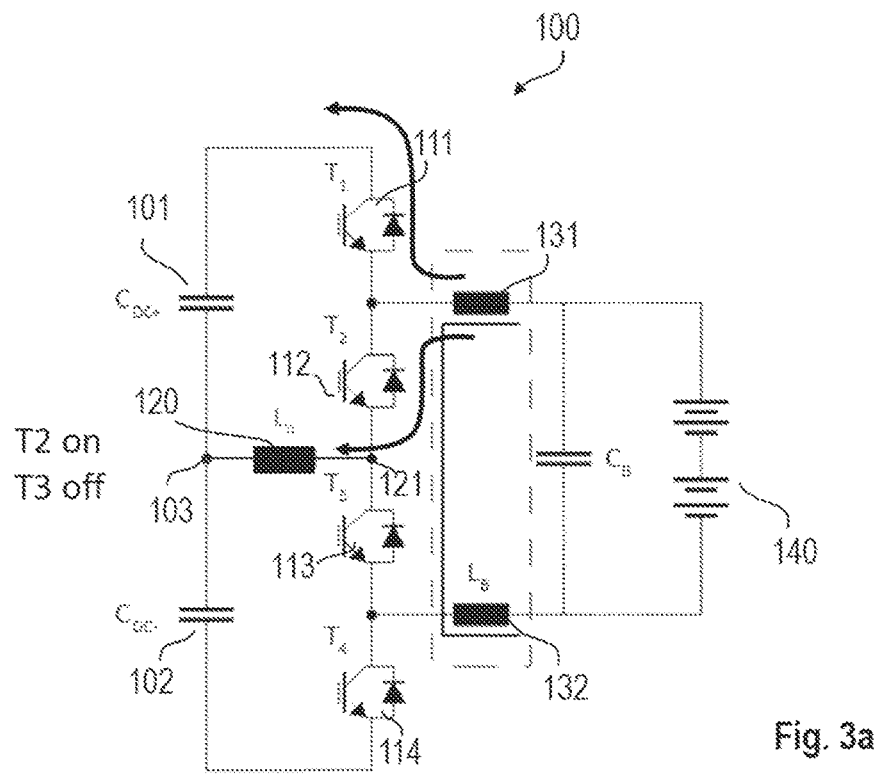
Fig. 3a
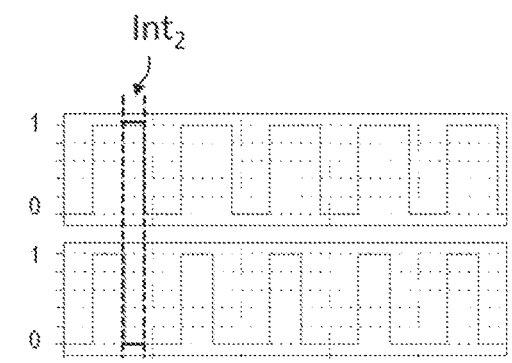
Fig. 3b
Fig. 3c
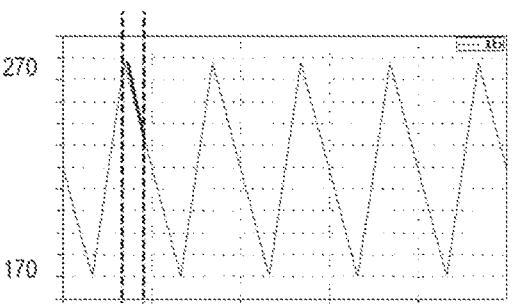
Fig. 3d
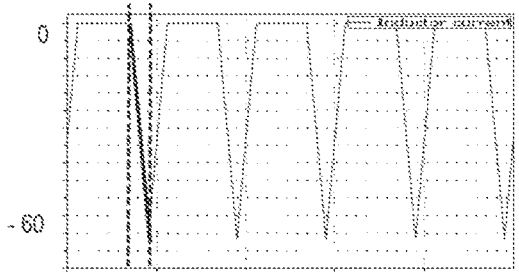
Fig. 3e

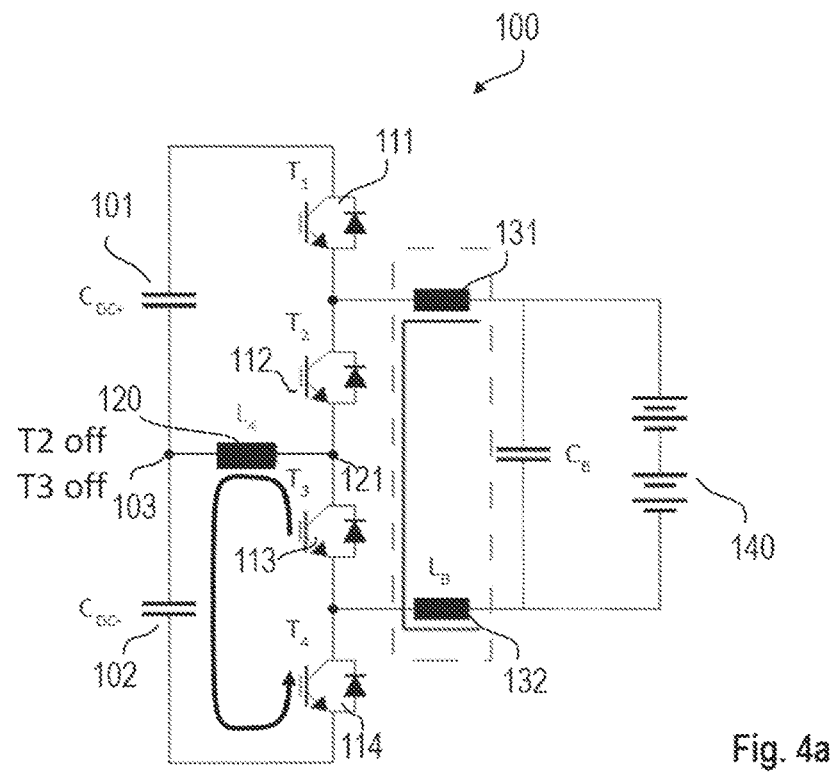
Fig. 4a
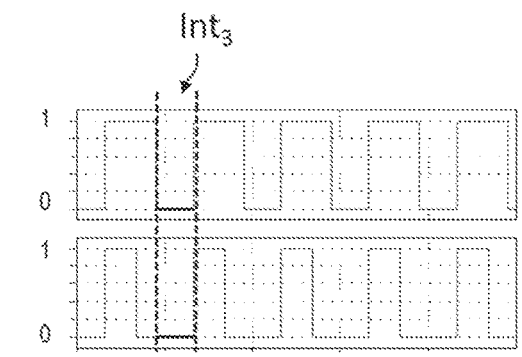
Fig. 4b
Fig. 4c
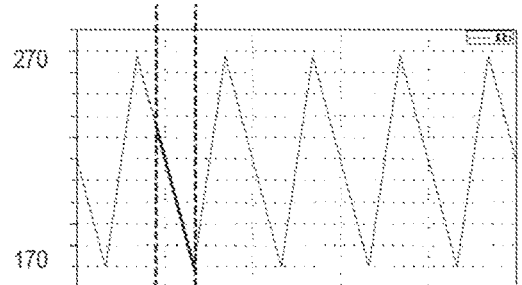
Fig. 4d
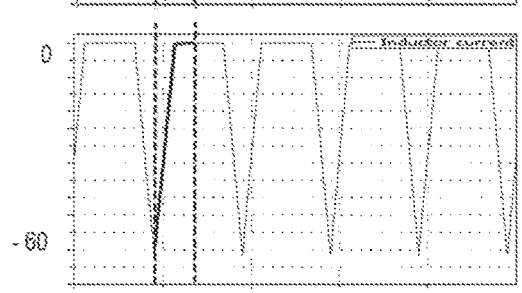
Fig. 4e

DOUBLE-BOOST DC/DC CONVERTER

CROSS-REFERENCE TO RELATED APPLICATIONS

This patent application claims priority to European Patent Application No. 21172502.3, filed on May 6, 2021, which is incorporated herein in its entirety by reference.

FIELD OF THE DISCLOSURE

The present disclosure relates to a voltage balancing circuit for a double-boost DC/DC converter, a double boost converter, a method for controlling a voltage balancing circuit for a double-boost DC/DC converter, a controller for a voltage balancing circuit, an uninterruptable power supply (UPS), and/or a usage of a voltage balancing circuit and a program element.

BACKGROUND OF THE INVENTION

The present disclosure relates to voltage balancing in split DC-link, as used (for example) in conjunction with Three-Level (3L) Neutral Point Clamped (NPC) topologies.

As of today, voltage balancing is accomplished by means of a dedicated balancing circuit, so-called 4th leg (buck-boost topology), driven in Discontinuous Conduction Mode (DCM). Other architectures may feature a neutral leg. Further, UPS are known for exploiting the balancing capability of the battery-line DC/DC converter implemented as a dual-boost converter and operated as a 3L converter.

UPS or photovoltaic inverters may face DC-link unbalance issues linked to the limited power capability of a 4th leg converter. The root cause may either be DC offset in the load current (e.g. half-wave rectifiers) but more often the presence of even harmonics on the load current (as motor soft-starters or non-linear load such as medical equipment). In double-conversion operation, the UPS may ensure balanced DC-link voltage with the aid of the rectifier, for example introducing DC offset and/or even harmonics in the input current. However, during stored-energy operation, the UPS is limited by the power capability of the 4th leg converter.

BRIEF SUMMARY OF THE INVENTION

The present disclosure describes embodiments for an improved double boost converter. Shortcomings of the prior art converters are addressed by the embodiments described herein.

The described embodiments pertain to the voltage balancing circuit for a double-boost DC/DC converter, the double boost converter, the method for controlling the voltage balancing circuit for the double-boost DC/DC converter, the controller for the voltage balancing circuit, the uninterruptable power supply (UPS), the usage of a voltage balancing circuit and the program element. Synergetic effects may arise from different combinations of the embodiments although they might not be described in detail.

BRIEF DESCRIPTION OF THE SEVERAL VIEWS OF THE DRAWING(S)

FIG. 3a shows the schematics of FIG. 1 and the flow of the current in a second phase, in accordance with the disclosure.

FIGS. 3b and 3c show a diagram of the control signal of the first and second inner switches in the second phase, in accordance with the disclosure.

FIG. 3d shows a diagram of the current through the inductance Lb connected to the DC source in the second phase, in accordance with the disclosure.

FIG. 3e shows a diagram of the current through the inductance L4 connected to the midpoints in the second phase, in accordance with the disclosure.

FIG. 4a shows the schematics of FIG. 1 and the flow of the current in a third phase, in accordance with the disclosure.

FIGS. 4b and 4c show a diagram of the control signal of the first and second inner switches in the third phase, in accordance with the disclosure.

FIG. 4d shows a diagram of the current through the inductance Lb connected to the DC source in the third phase, in accordance with the disclosure.

FIG. 4e shows a diagram of the current through the inductance L4 connected to the midpoints in the third phase, in accordance with the disclosure.

The figures are merely schematic and not to scale. In principle, identical or similar parts are given the same reference signs.

DETAILED DESCRIPTION OF THE INVENTION

In accordance with embodiments of the present disclosure, balancing capability may be enhanced with the contribution of the boost converter. Disclosed embodiments remove the need for a dedicated 4th leg converter, hence potentially reducing cost/footprint. At the same time, one aspect of the disclosed invention is the absence of Common Mode (CM) voltage at the DC source terminals. While some batteries are floating w.r.t. ground, and pretty tolerant of CM voltage, alternative energy storage technologies (especially those requiring an interfacing converter) may exhibit a CM voltage limit. Finally, these aspects also facilitate common DC source operation of multiple UPS systems. Therefore, cost and footprint are reduced, and the balancing capability of the UPS system is improved. The invention further provides an improved application compatibility, as it mitigates the limits of the current solution and facilitates compatibility with alternative energy storage system as well as paralleling of UPS systems at their DC port.

Figure 1:
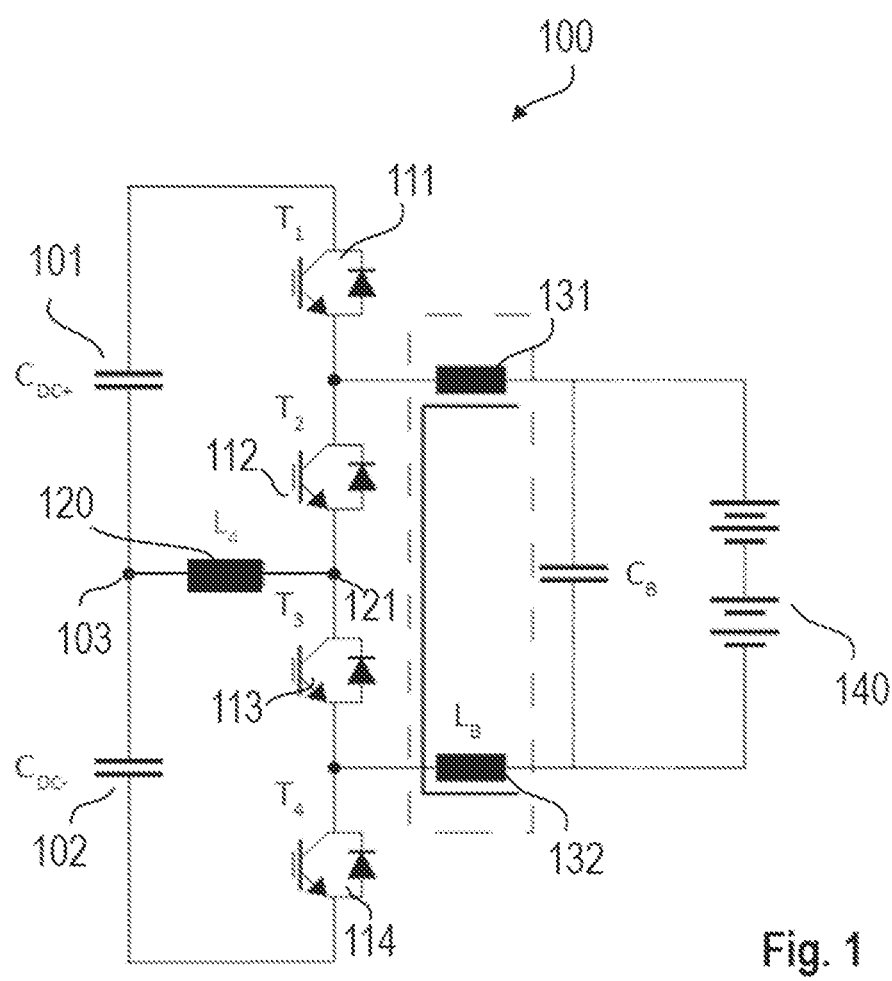
FIG. 1 shows a schematic of the topology of the voltage balancing circuit in accordance with the disclosure.

FIG. 1 shows a schematic of the topology of the voltage balancing circuit (100). The circuit is based on a converter topology that comprises a DC link consisting of a positive DC capacitor 101 and a negative capacitor 102. In between these capacitors is the midpoint 103. Parallel to the DC link 101, 102, a series of switches 111, 112, 113, and 114 are connected. The switches 111 and 114 that connect the DC link to the series of switches are referred to as "outer directional devices" or "outer switches". Correspondingly, the switches 112 and 113 between the outer switches are referred to as "inner switches". In the illustrated embodiment of FIG. 1, a switch consists of a transistor and an antiparallel freewheeling diode. The transistors are designated T1, T2, T3 and T4 corresponding to the switches 111, 112, 113, and 114. The inner switches 112, 113 are connected to each other at midpoint 121. The DC source 140 may be, here as an example, a battery. Battery 140 is connected over inductances 131 and 132, respectively, to the switches. In more detail, inductance 131 is connected to the connection point of the outer switch 111 and the inner switches 112, and inductance 132 is connected to the connection point of the inner switch 113 and the outer switch 114. The particularity in the depicted circuit 100 is the inductance L4 120 that is arranged between the midpoint 103 of the DC link 101, 102 and the midpoint 121 of the inner switches 112, 113. The inductance 120 enables the voltage balancing functionality as explained in the following. Inductors 131 and 132 as shown are coupled, that is, they are arranged as a single differential choke assembly with separate windings. However, in some embodiments, the windings may be separate.

Figure 2A:
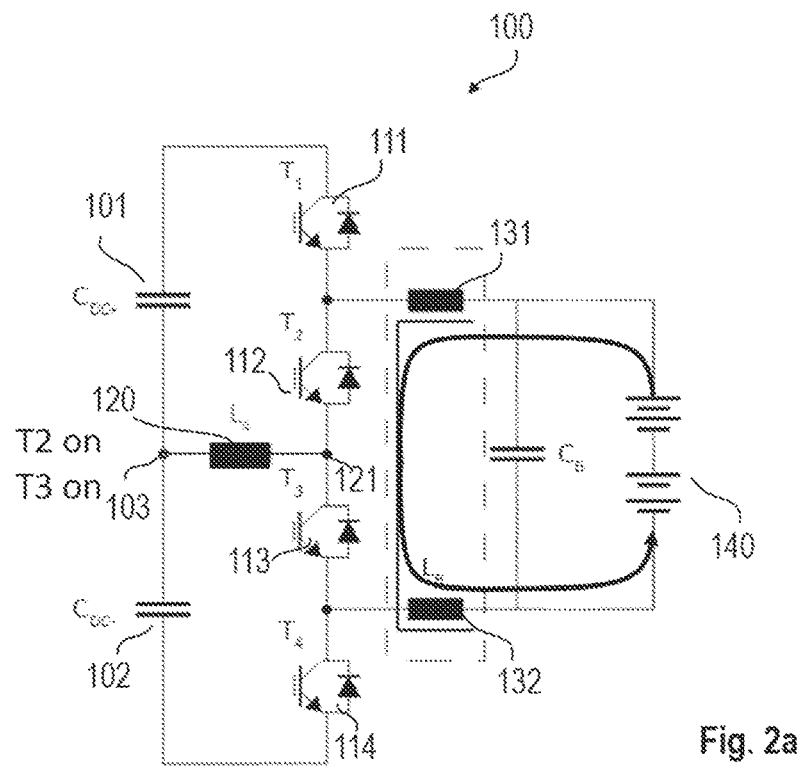
FIG. 2a shows the schematic of FIG. 1 and the flow of current therethrough in a first phase, in accordance with the disclosure.
Figure 2B:
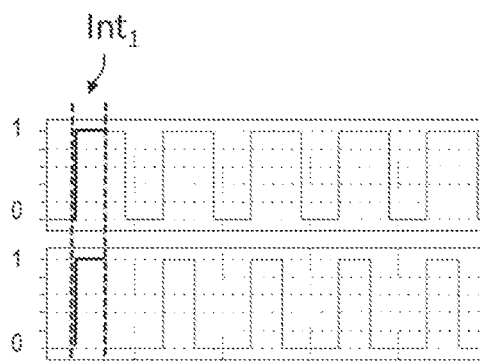
FIGS. 2b and 2c show a diagram of the control signal of the first and second inner switches in the first phase, in accordance with the disclosure.
Figure 2C:
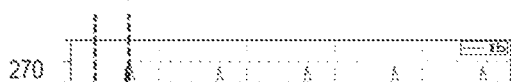
Figure 2D:
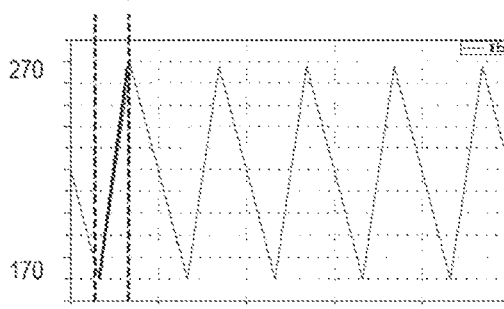
FIG. 2d shows a diagram of the current through the inductance Lb connected to a DC source, in accordance with the disclosure.
Figure 2E:
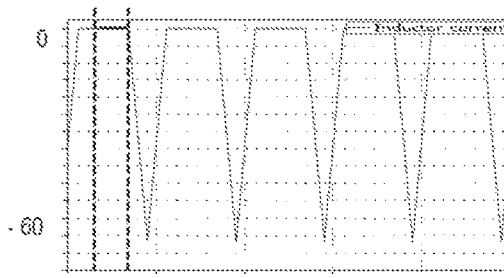
FIG. 2e shows a diagram of the current through the inductance L4 connected to the midpoints in the first phase, in accordance with the disclosure.

FIGS. 2a to 2e show the flow of the current in voltage balancing circuit 100 and diagrams of currents and the state of the inner switches during a first switching state. FIG. 2b shows the on-state of T2 and FIG. 2c the on-state of T3 corresponding to step S1 802 of the method 800 described herein and depicted in FIG. 8. FIG. 2a shows the flow of the current from the positive pole of the battery through inductance 131, the inner switches 112 and 113, and the inductance 132 to the minus pole 132 of the battery 140. By this flow of the current, the inductivities 131 and 132 are loaded. FIG. 2d shows the rise of the current in the inductance 131 connected to the battery 140. Since T2 and T3 are conductive, the voltage between the connection points of the inner and outer switches, i.e. between switches 111 and 112, and between switches 113 and 114, is zero, such that no current is flows to inductance 120 between the midpoints, as shown in FIG. 2e.

FIGS. 3a to 3e show the flow of the current in voltage balancing circuit 100 and diagrams of currents and the state of the inner switches during a second switching state. FIG. 3b shows the on-state of T2 and FIG. 3c the off-state of T3 corresponding to step S2 804 of the method described herein. Switching off T3 results in driving the current stored in inductance 131 over the freewheeling diode of switch 111 to the capacitor 101 on one hand and via the closed transistor to inductance 120. As shown in FIG. 3d, the current of inductance 131 decreases, whereas the amount of current of inductance 120 increases. Further, the current keeps flowing also through the freewheeling diode of T4 114 and inductor 132.

FIGS. 4a to 4e show the flow of the current in voltage balancing circuit 100 and diagrams of currents and the state of the inner switches during a third switching state. FIG. 4b shows the off-state of T2 and FIG. 4c the off-state of T3 corresponding to step S3 806 of the method described herein. In this phase, inductance 120 continues driving the flow of the current over DC capacitor 102 and freewheeling diode 114 and freewheeling diode of switch 114 back to the inductance 120. Thus, the stored current in 131 flows through the freewheeling diode of switch 111 and decreases therefore further as shown in FIG. 4d, and, which is the point, the current is decreased until zero before the next cycle starts. That is, by ensuring that twice the time extension, i.e. twice int2, which is the time between switching off T2 and T3, fully fits within the freewheeling phase there will be not CM voltage impressed on the battery terminals. This can also be expressed as Int3 has to be greater than Int2. In addition, current keeps flowing through inductors 132, 131 and freewheeling diode of T1 111.

Thus, the proposed topology and the delay between switching off T3 and T2 avoid that a voltage peak caused by continued conduction through free wheel diodes of outer switches when both inner switches are closed, that would result in common mode (CM) voltage impressed on the battery terminals.

DC voltage balancing may also be obtained by operating the BCB as a 4th Leg converter, when idle that is, driving ON T1 and T2 simultaneously, or T3 and T4 simultaneously, loading the L4 inductor, and leaving it to discharge through the FWD of the opposite pair.

Figure 5:
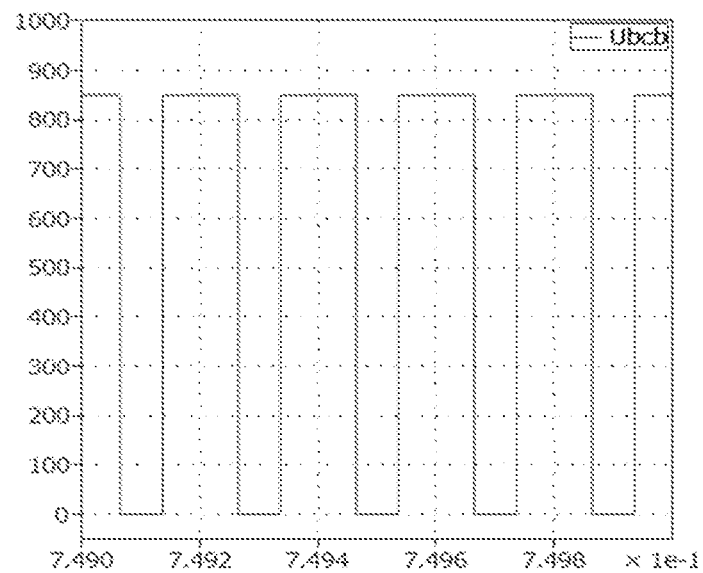
FIG. 5 shows a diagram of the voltage impressed by the converter bridge, in accordance with the disclosure.

FIG. 5 shows the differential voltage impressed by voltage balancing circuit bridge. The voltage is 850 V if one of T2 or T3 are open and 0 V if T2 and T3 are closed.

Figure 6:
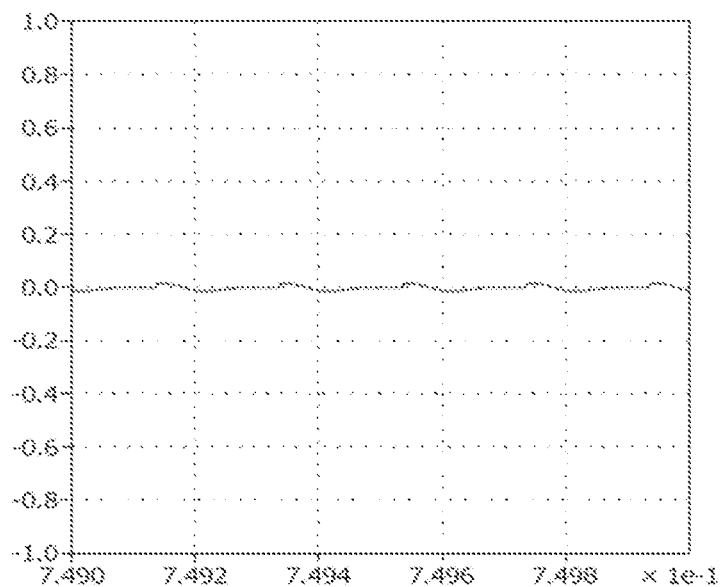
FIG. 6 shows a graph of common mode (CM) voltage on DC source terminals, in accordance with the disclosure.

FIG. 6 shows the CM voltage on battery terminals and it can be seen that the CM voltage remains approximately zero as desired.

Figure 7:
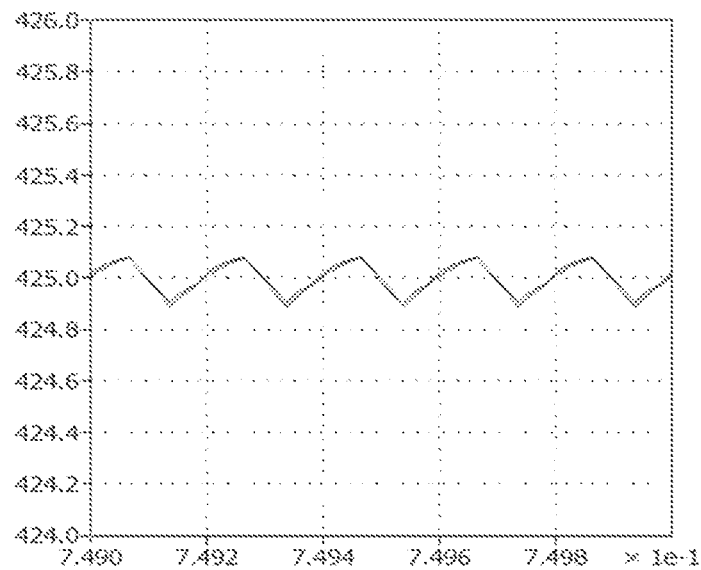
FIG. 7 shows a graph of DC link voltage, in accordance with the disclosure.

FIG. 7 shows the DC link voltage, which has only a slight ripple. The ripple is linked to the ratio of the battery voltage to the DC-link voltage. The voltage ripple may be reduced by increasing the DC-link capacitance and/or the converter switching frequency.

Figure 8:
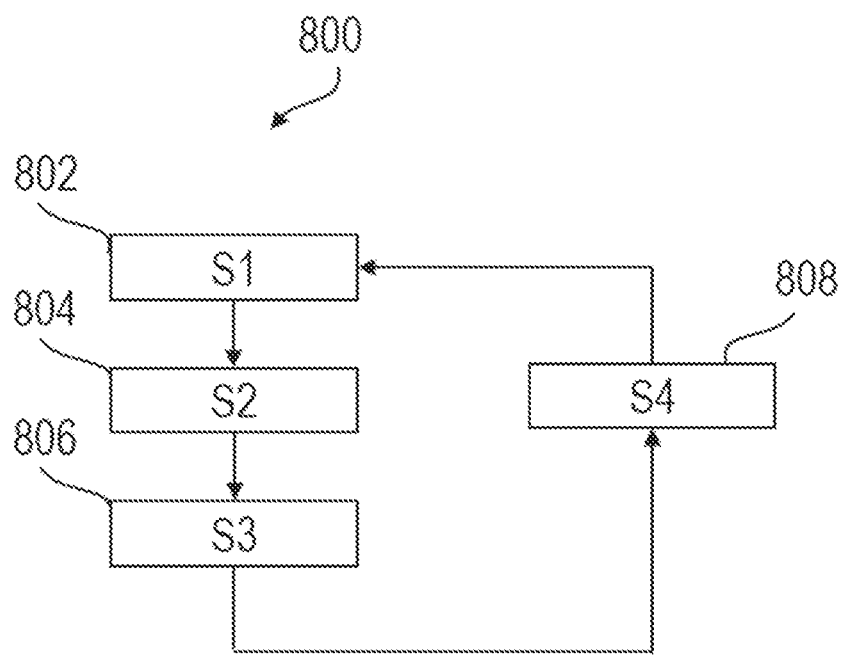
FIG. 8 shows a flow diagram of a method in accordance with the disclosure.

FIG. 8 shows a diagram of the method 800 comprising the following steps:

In a first step S1, 802: the first and the second switch are switched on. In a second step S2, 804, after a first time interval, the second switch is switched off. In a third step S3, 806, after a further second time interval, the first switch is switched off. In a fourth step, S4, 808, after a further third time interval, it is jumped to S1 802 and the previous steps are repeated.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

REFERENCE SIGNS LIST

100 Voltage balancing circuit
101 Positive DC split link capacitor

102 Negative DC split link capacitor
103 Midpoint of DC split link
111 Directional device (diode)/outer switch (transistor with anti-parallel diode) at positive DC bus
112 Upper inner switch
113 Lower inner switch
114 Directional device/outer switch at negative DC bus
120 Inductance connected between DC link midpoint and inner switches midpoint
121 Midpoint between inner switches
131 Inductance connected to positive terminal of DC source
132 Inductance connected to negative terminal of DC source
140 DC source
800 Method or controlling a voltage balancing circuit
802 Method step S1
804 Method step S2
806 Method step S3
808 Method step S4

In one general aspect, the present disclosure addresses shortcomings of the prior art by providing a voltage balancing circuit for a double-boost DC/DC converter, the double boost converter, the method for controlling the voltage balancing circuit for the double-boost DC/DC converter, the controller for the voltage balancing circuit, the uninterruptable power supply (UPS), the usage of a voltage balancing circuit and the program element. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a voltage balancing circuit for a double-boost DC/DC converter is provided. The voltage balancing circuit comprises a split DC-link with midpoint, outer directional devices and inner switches connected in parallel to the DC-link, wherein the directional devices are connected to capacitors of the split DC-link and to the inner switches, and the inner switches are connected to each other at a midpoint. The voltage balancing circuit further comprises a DC source terminal to which a DC source is connectable in parallel over inductances to the inner switches. An inductance is connected to the midpoint of the DC link and to the midpoint of the inner switches.

The proposed voltage balancing circuit allows for a converter operation and a DC source boost operation without generating undesired voltages, in particular undesired common mode voltages, at low effort in terms of hardware and controlling, and thus at low costs.

According to an embodiment, the switches comprise a transistor and an anti-parallel diode, and the directional devices are diodes. The diodes are directed such that they work as freewheeling diodes. For operating the circuit with the above-mentioned effects both in converter mode and in DC source mode, the switches have to be controllable and to provide freewheeling capability. Therefore, in this disclosure, the term "switch" is used for a controllable element such as a transistor and an associated freewheeling diode.

According to an embodiment, the directional devices further comprise transistors and the diodes are anti-parallel diodes with respect to these transistors. In this case, the directional devices have the same transistor-diode configuration as the inner switches, and are therefore called "outer switches" in this disclosure. The anti-parallel diodes are also called freewheeling diodes herein.

According to an embodiment, the inner switches comprise a first inner switch and a second inner switch, wherein the switches are configured to switch repeatedly according to the following scheme:
S1: the first and the second inner switch are switched on;
S2: after a first time interval, the second inner switch is switched off;
S3: after a further second time interval, the first inner switch is switched off;
S4: after a further third time interval, jump to S1.

The sequence of switching of the first and the second inner switch may be reversed such that S3 is performed prior to S2. That is, one of the inner switches is turned off later with a pre-defined delay with respect to the other inner switch. This measure allows voltage balancing without impressing an undesired common mode (CM) voltage on the DC source terminals. During step S2 current flowing into the inductance between the midpoints is stored and in S3, the current is dispensed again, before in step S4 the first and the second inner switch are switched on again such that no CM voltage is impressed on the DC source terminals.

According to an embodiment, the length of the third time interval is equal or greater than the second time interval. By configuring that twice the time extension fully fits within the freewheeling phase, it is ensured that the current will be fully dispensed, i.e. until 0 A is reached, before the first and the second inner switch are switched on again and thus it ensures that no CM voltage is impressed on the DC source terminals.

According to an embodiment, the voltage balancing circuit further comprises the DC source.

According to an embodiment, the DC source is a battery or a solar panel. The types of possible DC sources is, however, not limited thereto.

According to a second aspect, a double boost converter comprising a voltage balancing circuit according to the first aspect or an embodiment of the first aspect is provided. The double boost converter provides energy from a DC source, e.g. as part of a UPS or a solar inverter.

According to an embodiment, the double-boost converter is operated as a buck-boost converter for DC-link voltage balancing when no current is exchanged with the DC source.

That is, the voltage balancing circuit balances the DC-link voltage also when the double-boost converter for providing DC source current is operated as a buck-boost converter. This is achieved by a configuring the controlling of the switches in a usual way.

According to a third aspect, a method for controlling a voltage balancing circuit for a double-boost DC/DC converter is provided, comprising the steps:
S1: the first and the second inner switch are switched on;
S2: after a first time interval, the second inner switch is switched off;
S3: after a further second time interval, the first inner switch is switched off;
S4: after a further third time interval, jump to S1.

As mentioned in the explanations above with respect to the voltage balancing circuit, steps S2 and S3 may be inverted. For further explanations, it is referred to the description of the voltage balancing circuit and the figures.

According to a fourth aspect, a controller for a voltage balancing circuit as described herein is provided. The controller is configured to control the voltage balancing circuit performing the following steps: S1: the first and the second inner switch are switched on, S2: after a first time interval, the second inner switch is switched off, S3: after a further second time interval, the first inner switch is switched off, S4: after a further third time interval, jump to S1, which are the steps of the described method. The controller may comprise circuits without programmable logics or may be or comprise a micro controller, a field programmable gate array (FPGA), an ASIC, a Complex Programmable Logic Devices (CPLD), or any other programmable logic devices known to person skilled in the art.

According to an embodiment, the controller is configured to drive the voltage balancing circuit as a buck-boost converter for DC-link voltage balancing when no current is exchanged with the DC source. That is, the controller is configured such that it provides two operation modes. The first one is an operation as a double-boost converter, where the controller is configured to perform steps S1 to S4. The second one is an operation as buck-boost converter without involving the DC source. In this operation mode, the switches are controlled in another way. For example, the upper outer directional device and inner switch are turned on contemporarily while the lower directional device and inner switch are turned off, and vice versa. "Upper" means the part between the midpoint of the inner switches and the positive DC bus providing the connection of the positive DC capacitor and the upper directional device. The "lower" switches are accordingly the switches between the midpoint of the inner switches and the negative DC bus at the negative DC capacitor.

According to a fifth aspect, an uninterruptable power supply (UPS) comprising a voltage balancing circuit and/or a controller as described herein is provided.

According to a sixth aspect, a usage of a voltage balancing circuit according to the first aspect or an embodiment of the first aspect in an UPS, a photovoltaic/solar inverter, a Battery Energy Storage System (BESS), a converter interfacing a DC microgrid to an AC grid, or any suitable alternative energy storage system is provided.

According to a seventh aspect, a program element is provided that, when executed on a controller according to the fourth aspect or an embodiment of the fourth aspect, instructs the controller to perform the steps of the method according to the third aspect. The computer program element may be part of a computer program, but it can also be an entire program by itself. For example, the computer program element may be used to update an already existing computer program to get to the present invention.

A computer readable medium may be provided on which the program element is stored. For a UPS, the DC source may be a battery, whereas in other applications such as or a photovoltaic/solar inverter the DC source may, for example be a solar panel, a boost DC/DC converter, and an inverter. If the latter is a 3L NPC (3 level neutral point clamped)/TNPC (transistor neutral point clamped) inverter, a double-boost DC/DC converter may be used which, with the benefit of the invention, may offer balancing capability.

These and other features, aspects and advantages of the present invention will become better understood with reference to the accompanying figures and the foregoing description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A voltage balancing circuit for a double-boost DC/DC converter, comprising:
   a split DC-link having a first midpoint;
   outer switches and inner switches parallel-connected to the split DC-link, wherein the outer switches are connected to capacitors of the split DC-link and to the inner switches, the inner switches are connected to each other at a second midpoint, the inner switches comprise a first inner switch and a second inner switch, and the outer switches comprise a first outer switch and a second outer switch;
   a DC source terminal to which a DC source is connectable in parallel to the inner switches over inductances;
   wherein an inductance is connected to the first midpoint of the split DC link and to the second midpoint of the inner switches; and a controller configured to perform the following steps:
  in a first operation mode, where current is exchanged with the DC source:
    S1: the first and second inner switch are switched on;
    S2: after a first time interval, the second inner switch is switched off;
    S3: after a second time interval, the first inner switch is switched off;
    S4: after a third time interval, jump to S1; or
  in a second operation mode, where no current is exchanged with the DC source alternatingly:
    switching on the first outer switch and the first inner switch contemporarily and switching off the second outer switch and the second inner switch contemporarily,
    switching off the first outer switch and the first inner switch contemporarily and switching on the second outer switch and the second inner switch contemporarily.

2. The voltage balancing circuit according to claim 1, wherein the inner switches comprise a transistor and an anti-parallel diode, and the outer switches are diodes.

3. The voltage balancing circuit according to claim 2, wherein the outer switches further comprise transistors and the diodes are anti-parallel diodes with respect to these transistors.

4. The voltage balancing circuit according to claim 1, wherein the third time interval follows the second time interval, and wherein a length of the third time interval is equal or greater than a length of the second time interval.

5. The voltage balancing circuit according to claim 1, wherein the voltage balancing circuit further comprises the DC source.

6. The voltage balancing circuit according to claim 5, wherein the DC source is a battery or a solar panel.

7. A double boost converter comprising a voltage balancing circuit, the voltage balancing circuit including:
  a split DC-link having a first midpoint;
  outer switches and inner switches parallel-connected to the split DC-link, wherein the outer switches are connected to capacitors of the split DC-link and to the inner switches, and the inner switches are connected to each other at a second midpoint, the inner switches comprise a first inner switch and a second inner switch, and the outer switches comprise a first outer switch and a second outer switch;
  a DC source terminal to which a DC source is connectable in parallel to the inner switches over inductances;
  wherein an inductance is connected to the first midpoint of the split DC link and to the second midpoint of the inner switches; and
  a controller configured to perform the following steps:
    in a first operation mode, where current is exchanged with the DC source:
      S1: the first and second inner switch are switched on;
      S2: after a first time interval, the second inner switch is switched off;
      S3: after a second time interval, the first inner switch is switched off;
      S4: after a third time interval, jump to S1; or
    in a second operation mode, where no current is exchanged with the DC source alternatingly:
      switching on the first outer switch and the first inner switch contemporarily and switching off the second outer switch and the second inner switch contemporarily,
      switching off the first outer switch and the first inner switch contemporarily and switching on the second outer switch and the second inner switch contemporarily.

8. The double-boost converter according to claim 7, wherein the double-boost converter is operated as a buck-boost converter for DC-link voltage balancing when no current is exchanged with the DC source.

9. A method for controlling a voltage balancing circuit, the voltage balancing circuit including a split DC-link having a first midpoint, outer switches, first and second inner switches parallel-connected to the split DC-link, wherein the outer switches are connected to capacitors of the split DC-link and to the inner switches, and the inner switches are connected to each other at a second midpoint; and a DC source terminal to which a DC source is connectable in parallel to the inner switches over inductances; wherein an inductance is connected to the first midpoint of the split DC link and to the second midpoint of the inner switches, wherein the outer switches comprise a first outer switch and a second outer switch, the method comprising:
  in a first operation mode, where current is exchanged with the DC source:
    a first step, in which a first and second inner switches are switched on;
    a second step, in which after a first time interval, the second inner switch is switched off;
    a third step, in which after a further second time interval, the first inner switch is switched off; and
    a fourth step, in which after a further third time interval, the method returns to the first step; or
  in a second operation mode, where no current is exchanged with the DC source, alternatingly:
    switching on the first outer switch and the first inner switch contemporarily and switching off the second outer switch and the second inner switch contemporarily,
    switching off the first outer switch and the first inner switch contemporarily and switching on the second outer switch and the second inner switch contemporarily.

* * * * *